Sept. 21, 1926.

M. LATOUR 1,600,827

SPEED REGULATOR FOR HIGH FREQUENCY ALTERNATORS

Filed July 23, 1923

INVENTOR
MARIUS LATOUR
BY
ATTORNEY

Patented Sept. 21, 1926.

1,600,827

UNITED STATES PATENT OFFICE.

MARIUS LATOUR, OF PARIS, FRANCE, ASSIGNOR TO LATOUR CORPORATION, OF JERSEY CITY, NEW JERSEY, A CORPORATION OF DELAWARE.

SPEED REGULATOR FOR HIGH-FREQUENCY ALTERNATORS.

Application filed July 23, 1923, Serial No. 653,139, and in France October 3, 1922.

This invention relates to an arrangement for regulating the speed of a high frequency alternator driven by a direct current motor. In accordance with the invention, the exciting circuit of the motor or of the generator feeding the motor comprises in series a resistance the value of which may be directly varied by the flowing of the high frequency current in this resistance or in one of its elements.

Figure 1:
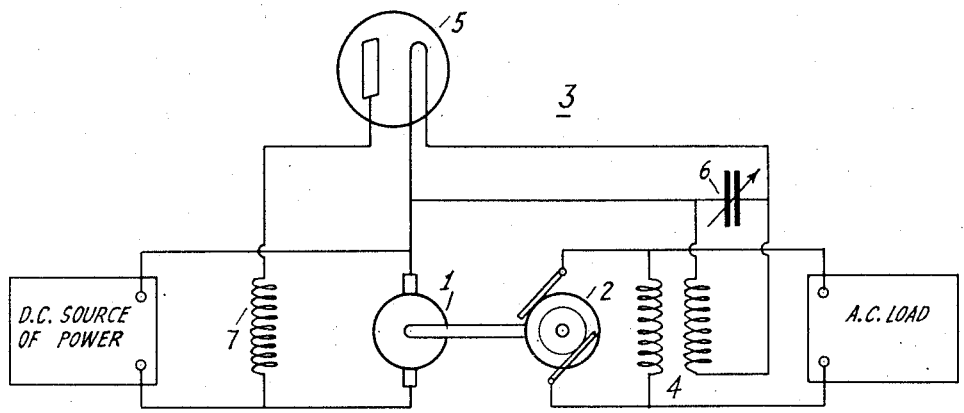
Figure 2:
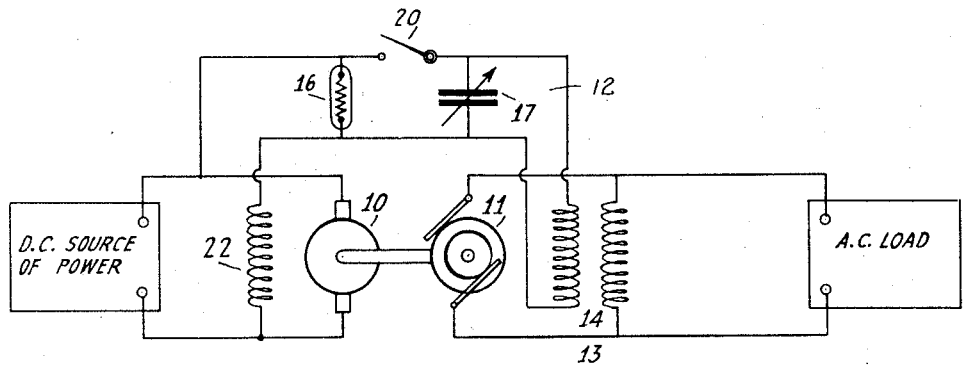

The various objects and advantages of my invention will be apparent from the following description taken in connection with the accompanying drawings, in which—
Fig. 1 is a schematic diagram of the present invention employing an electron device;

Fig. 2 is a schematic diagram of another form of the present invention employing a resistance device, the resistance of which varies with its temperature.

Let us assume that a Tungar type tube is inserted in the exciting circuit of the direct current motor which drives a high frequency alternator, and that it is inserted in such a manner that the exciting current may flow from the plate of the Tungar to its filament. The internal resistance of the Tungar tube may now be easily varied by a high frequency current generated by the alternator, if the filament is heated by this high frequency current.

Instead of the Tungar tube, a boron filament may be connected in series with the exciting circuit. As well known, the resistance of boron varies considerably with the effective intensity of the current by which it is traversed. If this boron filament is traversed at the same time by a high frequency current generated by the alternator then the resistance which is in series with the exciting circuit will be noticeably modified dependng on the intensity of this high frequency alternating current.

The same thing will happen, but in the opposite sense, if the exciting circuit is connected in series with metallic filaments (e. g. tungsten or iron filaments).

In any case, the resistance of the exciting circuit will be modified without performing any mechanical action by this high frequency current itself.

For the purpose of speed regulating, the high frequency current may be shunted at the terminals of the alternator through a circuit which is tuned either to a higher frequency (Tungar tube, boron filament), or to a lower frequency (metallic filaments).

This tuning system may of course be combined with any other known tuning system, and the high frequency circuit which feeds the variable resistance may be actuated by the output of the alternator.

The invention is applicable to systems in which the high frequency current must modify the resistance of the circuit of a magnetic amplifier or of an alternating current circuit in case the driving motor is an alternating current motor.

Referring to Fig. 1, a direct current motor 1 is connected across a direct current source of power as shown. Motor 1 is arranged to drive an alternating current generator 2 which in turn supplies an alternating current load. A tuned control circuit 3 comprises a secondary winding of the coupling transformer 4 and the filamentary cathode of a two element electron vacuum valve 5 connected as shown with the variable condenser 6 connected across the terminals of the secondary winding of transformer 4. The shunt field 7 of the direct current motor is connected across the direct current source of power through the electron valve as shown.

The system shown in Fig. 1 functions in the following manner:

The alternating current generator 2 is arranged to deliver power at a predetermined frequency. The tuned control circuit 3 is made sharply resonant to a frequency slightly above that of the predetermined frequency. If the load supplied by the alternating current generator is reduced, its frequency will tend to rise even though the motor 1 has a flat speed characteristic. This, of course, is due to the fact that the motor 1 must readjust itself to the new load condition.

When the frequency of the alternating current generator becomes equal to the resonant frequency of the tuned control circuit 3, a substantial increase of current will result in the filamentary cathode of the vacuum device 5. The increased electron emission from the filamentary cathode will result in an increased flow of current through the shunt field winding 7 effecting a quick de-acceleration of the motor speed and a decrease in the frequency of the generator 2 back to the above mentioned predetermined value.

Now referring to Fig. 2, a direct current motor 10 is connected across a direct source of power shown and is arranged to drive an alternating current generator 11 which in turn supplies variable alternating current to a load.

A tuned control circuit 12 is inductively coupled across the output of the alternating current generator by means of the coupling transformer 14. This tuned control circuit 12 comprises the secondary winding of the coupling transformer 14 and a filamentary resistance 16 having a positive or negative temperature coefficient such as boron or metallic filaments, respectively, arranged as shown with the variable condenser 17 connected across the terminals of the secondary winding of the coupling transformer 14. The tuned control circuit 12 is provided with a control switch 20 whereby this circuit may be disabled, if desired. The filamentary resistance 16 and a shunt field winding 22 of the direct current motor are connected in series across the direct current source of power as shown. The tuned control circuit is made sharply responsive to a frequency slightly above or slightly below the predetermined frequency of the alternating current generator 11, depending on the character of the resistance 16 employed.

If the load on the alternating current generator is now reduced, the speed of the motor will tend to increase, and when the frequency of the alternating current generator increases to a value equal to that to which the tuned control circuit 12 is resonant, a substantial increase of current will flow through the filamentary resistance. If this resistance is of boron, the resistance of which decreases with heat, there will result an increased flow of current through the shunt field winding 22. This will quickly reduce the speed of the motor 10, resulting in a quick decrease of frequency of the alternating current generator to its predetermined value. If the filament of resistance 16 is of a material whose resistance increases with the temperature, the tuned circuit 12 is made sharply resonant to a frequency slightly below the predetermined frequency of the alternating current generator 11.

If now, for any reason, the frequency of the generator decreases owing to a reduction in speed of the motor 10 when the frequency decreases to a value equal to that to which the circuit 12 is resonant, a large increase of current will flow in the resistance 16. This resistance will then increase in value resulting in a decrease of current flow through the shunt field winding 22. This will accelerate the speed of the motor to its desired value, resulting in an increase of the frequency to its predetermined value.

The several modifications are merely illustrative of the present invention and are not to be taken as limiting the scope of the invention.

Having described my invention, what I claim is:

1. A high frequency current generating system comprising an alternator, a direct current motor for driving the same comprising an exciting winding, a resistance in series with said winding, the value of which is a function of the current therein, and means for impressing on said resistance a current derived from the output circuit of said alternator.

2. A high frequency current generating system comprising a high frequency alternator, a direct current driving motor therefor, having an exciting winding, a boron filament in series with said winding, and means for impressing on said filament a current derived from the output of said alternator.

3. A high frequency current generating system comprising a high frequency alternator, a direct current driving motor therefor, said motor having an exciting winding and a resistance in series therewith, the value of which is a function of the current therein, and means for supplying said resistance with current derived from the output of said alternator, said means comprising a tuned circuit coupled to the output circuit of said alternator.

4. In a high frequency current generating system comprising an alternator, a motor for driving said alternator, a control circuit for said motor, a resistance in series with said control circuit, the value of which is a function of the current therein, and means for impressing on said resistance a current derived from the output circuit of said alternator.

5. In a high frequency current generating system comprising a high frequency alternator, a motor for driving said alternator, a control circuit for said motor, a boron resistance in series with said control circuit, and means for impressing on said resistance a current derived from the output of said alternator.

6. In a high frequency current generating system comprising a high frequency alternator, a motor for driving said alternator, said motor having a control circuit, a resistance in series with said control circuit the value of which is a function of the current therein, and means for supplying said resistance with current derived from the output of said alternator, said means comprising a tuned circuit coupled to the output of said alternator.

7. In a high frequency current generating system comprising an alternator, a motor for driving said alternator, a control circuit for said motor, a heat controlled variable resistance in series with said control circuit, and means for supplying current from the output of said alternator for variably heating said resistance.

MARIUS LATOUR.